Inventors:
Hugh M. Archer,
Howard A. Boltz,
by Vernet C. Kauffman
Their Attorney.

Feb. 20, 1951     H. M. ARCHER ET AL     2,542,299
BRIGHTNESS METER

Filed Dec. 2, 1948     2 Sheets—Sheet 2

Inventors:
Hugh M. Archer,
Howard A. Boltz,
by Vernet C. Kauffman
Their Attorney.

Patented Feb. 20, 1951

2,542,299

UNITED STATES PATENT OFFICE 2,542,299

BRIGHTNESS METER

Hugh M. Archer and Howard A. Boltz, Dearborn, Mich., assignors to General Electric Company, a corporation of New York Application December 2, 1948, Serial No. 63,085

2 Claims. (Cl. 250—214)

This invention relates to meters for measuring radiant energy.

Figure 1:
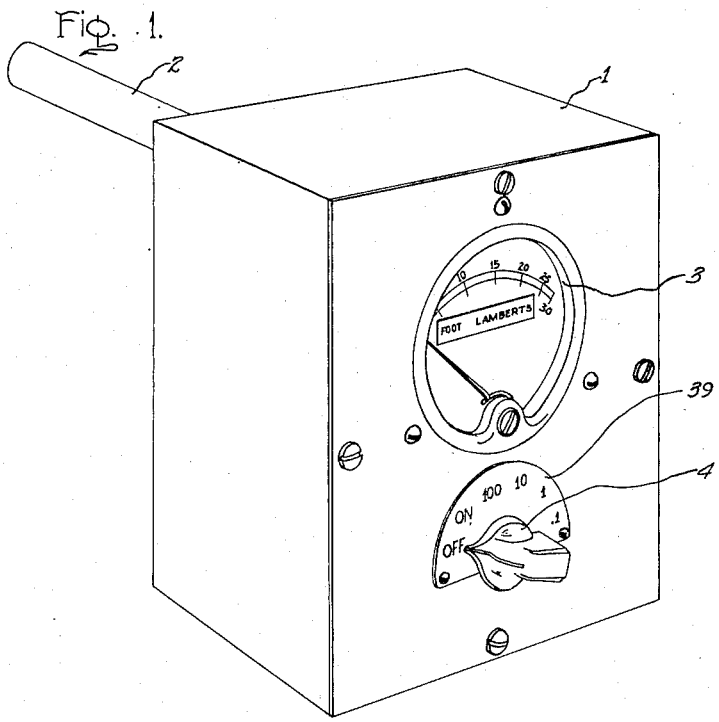
Figure 2:
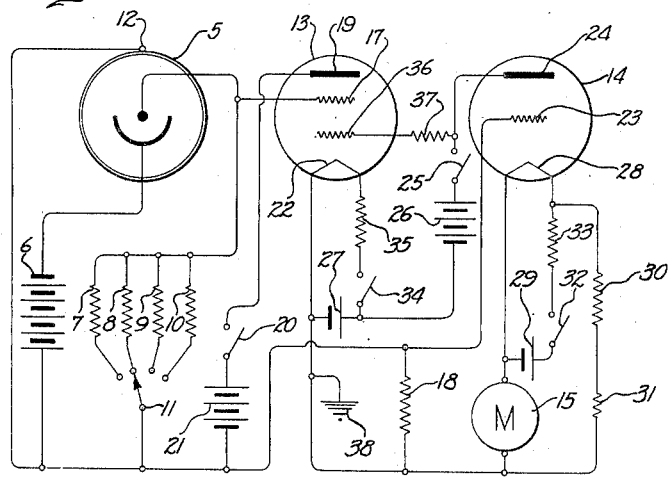
Figure 3:
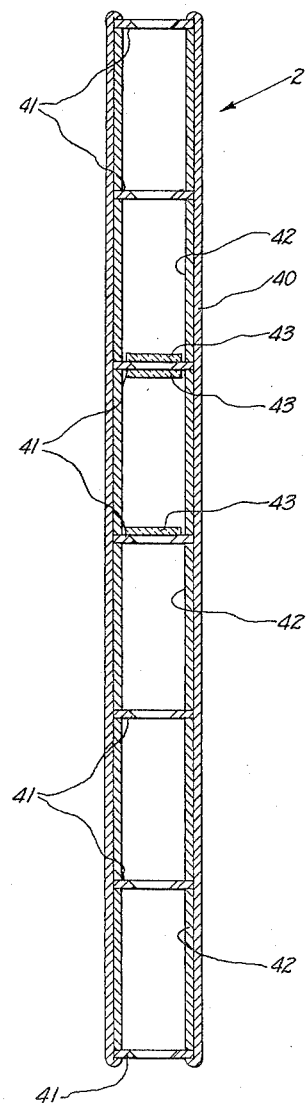

The principal object of the invention is to provide a portable, self-contained meter for measuring the brightness of a surface giving off radiant energy either by emission or reflective means, such as a lamp or a reflector. Further objects and advantages of the invention will appear from the following detailed description of species thereof and from the accompanying drawings in which Fig. 1 is a perspective view of a brightness meter embodying the invention; Fig. 2 is a wiring diagram of the meter shown in Fig. 1; and Fig. 3 is a sectional view of a collimating tube for the meter.

Referring to Fig. 1, the meter comprises a housing 1 having the collimating tube 2 projecting from its back panel and a dial 3 calibrated in foot-lamberts, together with a manual control switch knob 4 mounted on its front panel.

The housing 1 contains the apparatus shown diagrammatically in Fig. 2 which includes a photoelectric cell 5 mounted with its light-sensitive surface exposed to the radiations transmitted by the elongated collimating tube 2. The latter, which is described in detail hereinafter, defines a viewing angle of desired magnitude for the photocell 5. The collimating tube 2 passes a constant amount of radiation to the photocell 5 from a surface of constant and uniform brightness, even when the distance between the surface and the aperture is changed, provided the viewing cone is completely intercepted by the said surface. In use the meter is held with the tube 2 aimed at the surface whose brightness is to be measured. A viewing angle of 1½ degrees is preferred though this may be changed to suit various service conditions.

The photocell 5 is connected across the terminals of the battery 6 in series with a resistance from the bank of resistance 7, 8, 9 and 10, any one of which may be connected in series with the photocell by the selector switch 11. The guard ring 12 of the photocell is also connected to the battery 6. The resistances 7, 8, 9 and 10 are of different values to adjust the range of the meter for measuring light sources of different brightness. The current flowing in the photocell circuit increases or decreases in accordance with corresponding changes in the intensity of light on the light-sensitive surface of the photocell.

A two-stage direct current amplifier comprising a tetrode 13 and a triode 14 is provided between the photocell 5 and the microammeter 15 which is connected into the cathode lead of the triode 14 for measuring the plate current of the latter. Small changes in the current flowing in the photocell circuit are thus amplified for measurement by the microammeter which is calibrated in foot-lamberts to indicate the brightness of the source to be measured by the meter.

The screen or input grid 17 of the tetrode 13 is connected into the photocell circuit between the photocell resistances 7, 8, 9 or 10 and the terminal of the photocell connected to the positive terminal of battery 6. The circuit of grid 17 thus includes one of the aforesaid resistances and the resistance 18 connected to the cathode 22 of the tetrode 13. An increase in radiation affecting the photocell 5 thus drives the input grid 17 more negative to reduce the current flow in the circuit including plate 19, switch 20, battery 21, resistance 18 and a cathode or filament 22 of tetrode 13. The change in voltage across the resistance 18 is opposite to the change produced in the input circuit by the photocell and thus has a degenerative effect resulting in a lesser net change in potential from the grid 17 to the filament 22 than that produced by the photocell alone.

The input to the control grid 23 of the triode 14 is taken from the side of resistance 18 common to the input circuit of the brightness meter so that the voltage developed across resistance 18 is applied to the grid 23. An increase in the photocell output resulting from an increase in the intensity of light incident thereon thus produces an increase of current flow in the triode plate circuit including the plate 24, switch 25, battery 26, battery 27 for heating the tetrode filament 22, microammeter 15 and the triode filament 28. The increased current flow in the plate circuit is measured by the microammeter which is calibrated to indicate the brightness of the light source to be measured, as pointed out above.

To obtain a zero adjustment of the circuit when the photocell 5 is not receiving radiation, a special bucking circuit is provided in the filament or cathode circuit of the triode 14. The bucking current is provided by shunting the terminals of the filament battery 29 around the microammeter 15 through suitable resistances so as to provide a current opposite in direction and equal to the amplifier output current in the dark condition of the photocell 5. As shown in Fig. 2, the shunt circuit includes the resistances 30, 31 and 32, battery 29, and filament 28.

We have observed that the filament voltage, and therewith the plate current, changes as the filament battery 29 deteriorates. The value of resistances 30 and 31 is therefore selected, together with the other circuit components, so that the changes in the plate and bucking currents are equal and opposite as the battery 29 deteriorates, thus keeping the zero balance constant despite a change in filament voltage of the triode 14.

The tetrode 13 is provided with the usual filament switch 34 and resistance 35. The space charge grid 36 of the tetrode 13 is connected through resistance 37 to the lead to plate 24 of the triode 14. The lead between filament 22 and resistance 18 of the tetrode 13 is grounded as indicated at 38.

All the switches of the brightness meter are mounted on a common shaft (not shown) provided with the turning pointer knob 4 on the front panel of the housing 1. A position indicating dial 39 is disposed on the housing and around the shaft supporting knob 4. The switches are mounted on the shaft in such manner that as the shaft is rotated the filament switches 34 and 32 are closed first to energize the filaments 22 and 28, the switches 20 and 25 are then closed to energize the plate circuits of the tetrode 13 and the triode 14, and the selector switch 11 is then adjusted to connect one of the resistances 7, 8, 9 or 10 into the photocell circuit. The resistances 7, 8, 9 and 10 adapt the brightness meter for measuring the brightness of light sources over a wide range.

As shown in Fig. 3 of the drawing, the collimating tube 2 is made up of an elongated metal tube 40 having a series of metal diaphragms 41 held in position by tubular metal spacers 42. The ends of the elongated tube 40 are turned back into the tube to hold the assembly of spacers and diaphragms firmly in position between them. Filter windows 43, such as glass windows, or the like, having the desired light-transmitting characteristics for color correction of the meter to follow the eye-sensitivity curve, are mounted on the middle diaphragm and the next diaphragm in the series. The windows 43 may be cemented to the diaphragms 41 and all the interior surfaces of the collimating tube, with the exception of the windows, are covered with lamp black to minimize internal reflections.

In a specific embodiment of the brightness meter, the openings in the diaphragms 41 defined a viewing angle of 1½ degrees, the tube 40 was 8 inches long and ¾ inch in outside diameter and the outer dimensions of housing 1 was 4 by 5 by 6 inches. The photocell 5 was an RCA 935, the tetrode 13 was a VX 41, the triode was a VX 32, and the values of the resistances were as follows:

Resistance 7 = 80 ohms
Resistance 8 = 800 ohms
Resistance 9 = 8,000 ohms
Resistance 10 = 80,000 ohms
Resistance 18 = 400,000 ohms
Resistance 30 = 10,000 ohms
Resistance 31 = 3,000 ohms
Resistance 33 = 25 ohms
Resistance 35 = 25 ohms
Resistance 37 = 29,000 ohms The dry cell battery voltages were as follows:

Battery 6 = 67.5 volts
Battery 21 = 4.5 volts
Battery 26 = 7.5 volts
Battery 27 = 1.5 volts
Battery 28 = 1.5 volts The microammeter 15 was a Weston 0 to 30 microampere meter.

What we claim as new and desire to secure by Letters Patent of the United States is:

1. An electro-optical system for measuring the brightness of light sources comprising in combination, an elongated collimating tube defining a viewing field of predetermined dimensions, a photoelectric cell mounted in light-receiving relation to said tube, a two-stage vacuum tube amplifier coupled to said cell and a current-measuring means connected so as to measure the output of said amplifier, said amplifier comprising a tetrode and a triode with the input grid of the tetrode connected to the positive side of the photocell circuit and the grid circuit including a resistance in common with the plate circuit of the tetrode whereby the output voltage of the tetrode developed across said resistance as well as the signal voltage produced by the photocell is applied to said input grid, the input grid circuit of the triode also including said resistance whereby the voltage developed across said resistance is applied to said grid.

2. In a battery operated electro-optical system comprising a photoelectric cell, a two-stage vacuum tube amplifier for said cell comprising a tetrode and a triode and a current-measuring instrument connected into the output circuit of the triode, connections between the input grid of the tetrode and the positive side of the photocell circuit, a resistance common to the grid circuit and the plate circuit of the tetrode to modify the charge on the grid, said resistance being included also in the input grid circuit of the triode.

HUGH M. ARCHER.
HOWARD A. BOLTZ.

REFERENCES CITED

The following references are of record in the file of this patent:

UNITED STATES PATENTS

| Number | Name | Date |
|---|---|---|
| 2,089,014 | Bucknam et al. | Aug. 3, 1937 |
| 2,326,878 | Muller | Aug. 17, 1943 |